(12) United States Patent
Arnouse

(10) Patent No.: US 12,463,921 B1
(45) Date of Patent: Nov. 4, 2025

(54) SYSTEMS, DEVICES, AND METHODS FOR WIRELESS EDGE COMPUTING

(71) Applicant: Arnouse Digital Devices Corp., Lake Success, NY (US)

(72) Inventor: Michael Arnouse, Old Brookville, NY (US)

(73) Assignee: Arnouse Digital Devices Corp., Lake Success, NY (US)

( * ) Notice: Subject to any disclaimer, the term of this patent is extended or adjusted under 35 U.S.C. 154(b) by 60 days.

(21) Appl. No.: 17/585,328

(22) Filed: Jan. 26, 2022

Related U.S. Application Data

(60) Provisional application No. 63/142,272, filed on Jan. 27, 2021.

(51) Int. Cl.
*H04L 49/351* (2022.01)

(52) U.S. Cl.
CPC ................. *H04L 49/351* (2013.01)

(58) Field of Classification Search
CPC ..................................... H04L 49/351
See application file for complete search history.

(56) References Cited

U.S. PATENT DOCUMENTS

| | | | | |
|---|---|---|---|---|
| 6,295,293 B1* | 9/2001 | Tonnby | ............... | H04L 12/2856 375/E7.02 |
| 6,594,279 B1* | 7/2003 | Nguyen | ............... | H04J 3/1617 370/468 |
| 6,925,641 B1* | 8/2005 | Elabd | ............... | G06F 9/505 710/1 |
| 7,480,303 B1* | 1/2009 | Ngai | ............... | H04L 49/901 370/395.5 |
| 9,712,541 B1* | 7/2017 | Harris | ............... | H04L 63/108 |
| 10,623,309 B1* | 4/2020 | Gampel | ............... | H04L 41/0894 |
| 2006/0075144 A1* | 4/2006 | Challener | ............... | H04L 63/08 709/217 |
| 2008/0034439 A1* | 2/2008 | Chen | ............... | H04L 63/105 726/27 |
| 2008/0285576 A1* | 11/2008 | Teener | ............... | H04N 21/43632 370/403 |
| 2009/0158377 A1* | 6/2009 | Diab | ............... | G09G 5/006 725/117 |
| 2011/0136439 A1* | 6/2011 | Tan | ............... | H04W 24/08 455/67.11 |
| 2013/0034184 A1* | 2/2013 | Roh | ............... | H04L 12/413 375/295 |
| 2013/0145052 A1* | 6/2013 | Aiken | ............... | G06F 9/4411 710/9 |

(Continued)

*Primary Examiner* — Luat Phung
(74) *Attorney, Agent, or Firm* — DLA Piper LLP (US)

(57) ABSTRACT

An edge computing and communications device may include an Ethernet switch comprising a management port and a plurality of medium dependent interface (MDI) ports, a plurality of Ethernet to peripheral component interconnect express (PCIe) converters, wherein each of the plurality of MDI ports is connected to a PCIe converter of the plurality of PCIe converters, a plurality of computing devices comprising a first PCIe port and a second PCIe port, wherein each of the first PCIe ports is connected to a PCIe converter of the plurality of PCIe converters, an open compute project network interface card comprising a fiber optic port and a plurality of third PCIe ports, wherein each of the second PCIe ports is connected to a third PCIe port and the fiber optic port is connected to the internet.

16 Claims, 2 Drawing Sheets

(56) References Cited

U.S. PATENT DOCUMENTS

| | | | |
|---|---|---|---|
| 2015/0058997 A1* | 2/2015 | Lee | G06F 9/45558 726/26 |
| 2019/0245924 A1* | 8/2019 | Li | G06F 3/0635 |
| 2021/0056058 A1* | 2/2021 | Lee | G06F 13/4221 |
| 2021/0334226 A1* | 10/2021 | Yeung | G06F 13/382 |

* cited by examiner

SYSTEMS, DEVICES, AND METHODS FOR WIRELESS EDGE COMPUTING

FIELD OF TECHNOLOGY

The present disclosure relates to systems, devices, and methods for edge computing and 5G wireless communications.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
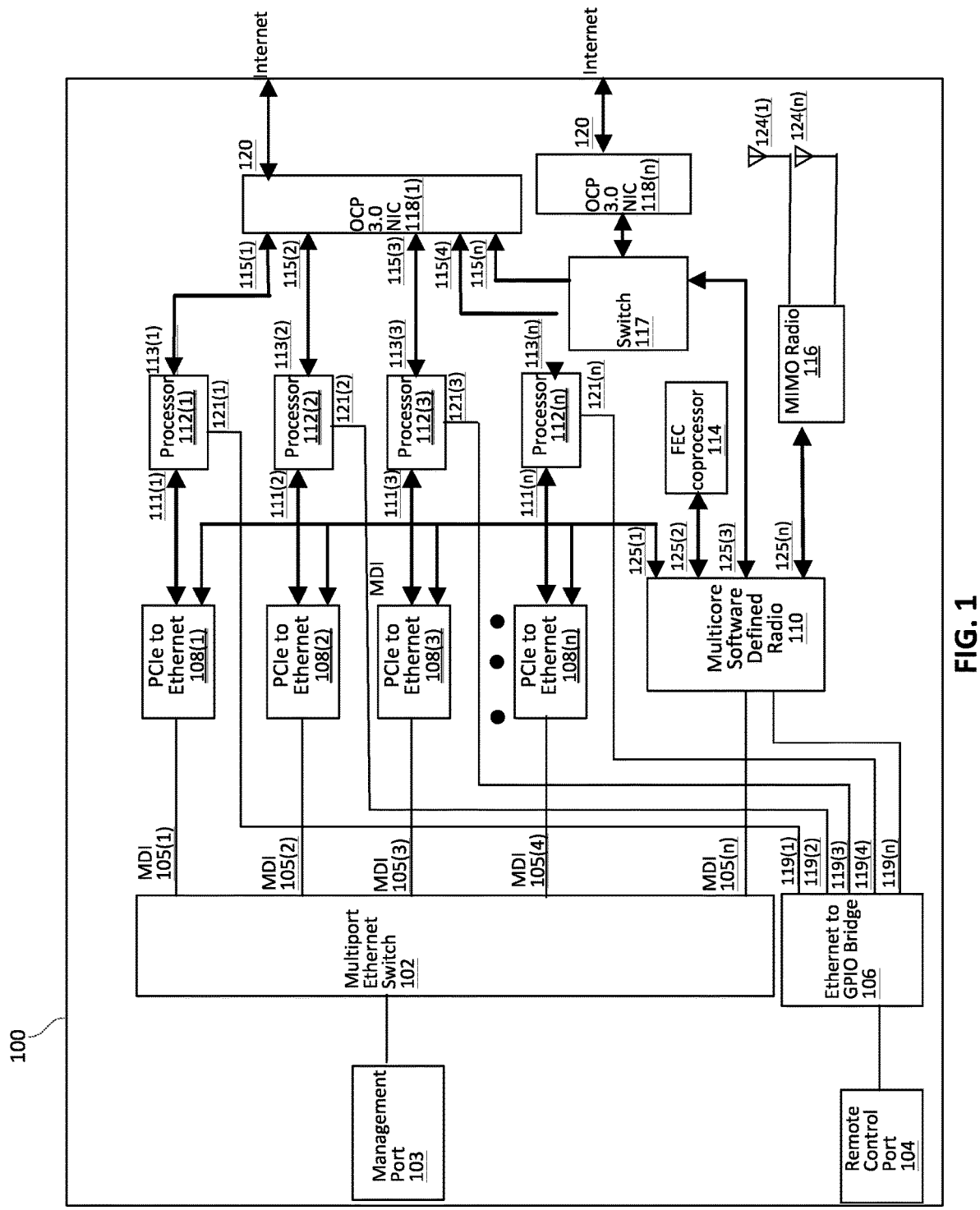
FIG. 1 illustrates a device and system for 5G edge computing and communications, according to an embodiment of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the present disclosure describes systems, devices, and methods for a 5G edge compute and communications architecture. In some examples, the system may include multiple host compute modules available at the network edge for high performance, low latency, and secure computing and communications.

The 5G edge computer may be deployed in areas where there is already macro network coverage. The 5G edge computer may be used as compute and wireless access capacity boosters in areas with limited macro cell coverage. The 5G edge computer may be deployed indoors and/or outdoors as it may be packaged to withstand the outdoor elements. The 5G edge computer may be installed outdoors on telephone poles, utility poles, bus stop shelters, traffic intersections, etc. The 5G edge computer may be deployed in modern buildings with metal coated windows and good isolation from the macro coverage and may interact (handoff) with the macro network as user equipment move in and out of the buildings. The 5G edge computer may be isolated from the macro radio access network and/or integrated with the macro network. The 5G edge computer may be deployed and operated as an integrated part of the 3G, 4G, 5G, 6G, WiFi radio network. This enables the 5G edge computer to provide a consistent user experience while being managed as a part of the overall radio access network.

The 5G edge computer may include self-optimizing network (SON) functionality to correctly configure and maintain neighboring cell relations and physical cell ID codes. In some examples, backhaul to the core network from macro sites can be reused for the 5G edge computer installation sites. The 5G edge computer may have a first hop as Ethernet over optical fiber (400GPS Ethernet over fiber), Ethernet over copper, or microwave backhaul directly to the core network or to a macro base station, where backhaul is aggregated towards the core network. The 5G edge computer may be quick and easy to deploy by providing power and backhaul connection (e.g., optical fiber or copper).

The 5G edge computer may improve coverage, capacity and edge computing features relating to latency, traffic volumes, and data rates. The 5G edge computer can meet these accelerating demands using network functions virtualization (NFV) techniques. The 5G edge computer may enable data center processing capabilities in the network including content distribution. When deployed indoors, the 5G edge computer may be individual building cloud data centers and RANs. The 5G edge computer may boost performance in traffic hotspots such as offices, stadiums, city squares, commuter hubs and other high traffic locations.

Legacy mobile networks are dominated by macro cells. These are large cells typically mounted on a mast or roof top in cities and towns, alongside motorways or on rural hills. Macro cells have a radio coverage range of a few miles to tens of miles and are served by a high-powered cellular base station. However, the continuous increase in mobile data traffic volumes has required operators to upgrade their network capacity. To that end, one of the most effective approaches is to enhance the spatial reuse of limited spectrum and increase coverage is through deployment of the 5G edge computer to complement existing macro cellular networks. The 5G edge computer may include various access models, including open-access (all subscribers of a particular operator can connect), closed access (connectivity restricted to certain users, for instance in an enterprise environment), and hybrid access (open access small cells which might periodically become closed access). The 5G edge computer supports the ever-growing data traffic volumes attributed to the increased adoption of smart devices (e.g., smart cars, IoT, smartphones, mobile virtual reality platforms etc.) and bandwidth-intensive services (e.g. 4K/8K video streaming).

The 5G edge computer may include multiple computing modules (e.g., compute cards) each with multiple CPU cores (e.g., 8 cores, 16 cores, etc.). The 5G edge computer may be configured to provide distributed edge computing. Edge computing refers to locating applications and the general-purpose compute, storage, and associated switching and control functions needed to run them relatively close to end users and/or IoT endpoints. Bringing the 5G edge computer closer to the users greatly benefits applications performance and associated quality of experience, and it can also improve efficiency of the specific application. To improve the performance and efficiency of delivering content, the 5G edge computer may be widely geographically distributed to cache content and quickly deliver it to users. Enabling applications and content to be localized in the 5G edge computer close to end users improves network transit latency. Latency is a significant driver in improved performance as is high reliability, e.g. through setting up radio bearers that allow low block error rate tolerance. Edge compute combined with the optimized latency performance of 5G NR air interface and 5G core processing in the 5G edge computer can reduce round-trip-time by up to two orders of magnitude. This will enable new classes of cloud applications, in such areas as industrial robotic/drone automation, V2X, and AR/VR infotainment, and associated innovative business models. Edge computing is also important for localization of data and efficient data processing. Industry and Government regulations may require localization of data for security and privacy reasons. Certain classified or sensitive application scenarios may pose restrictions on the use of excessive transport bandwidth or may require transport to external sites to be scheduled by time-of-day, requiring local storage or local caching of information provided by the 5G edge computer.

The 5G edge computer may enable metro level edge clouds that host low latency broad-based consumer and enterprise applications. Edge clouds may be located close to end users and may host ultra-low latency and/or high reliability applications and may be targeted at high value industrial automation, government, military, and IoT users. In addition to hosting new 5G services, the other major network operator driver for edge compute and edge clouds is deploying virtualized network infrastructure, replacing dedicated hardware-based elements with virtual network functions (VNFs) and software defined radio (SDR) running on multicore CPUs in the 5G edge computer.

The 5G edge computer includes VNF that enables cloud level implementation of network functions, which in turn is a key enabler for providing dynamic networks for 5G services. Many of these network functions, as well as the applications running in the edge cloud, require hardware acceleration (in the form of coprocessor for forward error correction, network processors, GPUs, ARM processor arrays) to handle the high computational, signal processing, throughput and low latency demands. A key architectural innovation for the 5G edge computer is control & user plane separation (CUPS), which allows multiple levels of user plane gateways corresponding to multiple levels of edge cloud distribution and applications placement. Further, the 5G edge computer supports ETSI multi-access edge compute (MEC) that has defined enablement functions to support application placement in distributed edge clouds. This includes an application hosting environment and APIs to provide network intelligence to applications (e.g. current loading levels on different access types, mobility event triggers for applications that need to transfer state to another application instance in a new serving edge cloud).

FIG. 1 illustrates an edge computing and communications device 100 (e.g., the 5G edge computer) for 5G edge cloud computing, according to an embodiment of the present disclosure. The edge computing and communications device 100 may include multiple processors 112(1) . . . 112(n) for providing edge cloud computing. The 5G edge cloud computing device 100 may include at least one remote control port 104, multiple processors 112(1) . . . 112(n), a plurality of communication ports 118(1) . . . 118(n), a MIMO radio frequency transceiver 116, and a software defined radio 110. The software defined radio 110 may be configured to execute the software defined radio conformant with 3GPP standards. The edge computing and communications device 100 may be configured to execute cloud based application software as described above. In some examples, the communication ports 118(1) . . . 118(n) provide a network backhaul for data traffic. In some examples, the cloud based application software includes at least one of content delivery, enterprise applications, mobile commerce, social networking, and video conferencing.

In some examples, the edge computing and communications device 100 may be mounted in areas of high human and vehicle traffic (e.g., on a traffic light pole) or areas requiring security monitoring (banks). The edge computing and communications device 100 may sense vehicles via image sensors and/or communicate with vehicles in the area. The edge computing and communications device 100 may perform traffic congestion control by sensing traffic conditions and controlling traffic control signals (traffic lights) in the area. In some examples, edge computing and communications device 100 may send control signals to vehicles in the area to assist in the safe and efficient flow of vehicles, pedestrians, bikers, etc. in the area. In some examples, edge computing and communications device 100 may send control signals to vehicles in the area to control the speed of the vehicles (e.g. stop the vehicle, slow down the vehicle, shut down the vehicle, etc.)

In some examples, the edge computing and communications device 100 may include a camera that may send images of the area to first responders (e.g., fire, police, ambulance). The captured images (still or video) may assist the first responders in responding to emergencies. The images may allow the first responders to make decisions as to the urgency and nature of the response thereby reducing false alarms and prioritizing response. In some examples, edge computing and communications device 100 may contact emergency services (e.g., e911) autonomously. The edge computing and communications device 100 may include artificial intelligence capable of detecting emergency conditions. For example, the edge computing and communications device 100 may include microphones trained to detect emergency conditions such as auto accidents, gunshots, victim screams, etc. The edge computing and communications device 100 may also use captured images processed by artificial intelligence that may determine if an emergency exists and contact the proper first responders providing them with the captured audio and video.

In some examples, the edge computing and communications device 100 may include an Ethernet switch 102 comprising a management port 103 and a plurality of medium dependent interface (MDI) ports 105(1) . . . 105(n).

In some examples, the edge computing and communications device 100 may include a plurality of Ethernet to peripheral component interconnect express (PCIe) converters 108(1) . . . 108(n). Each of the plurality of MDI ports 105(1) . . . 105(n) may be connected to a PCIe converter 108 of the plurality of PCIe converters 108(1) . . . 180(n).

In some examples, the edge computing and communications device 100 may include a plurality of computing modules (e.g., processors) 112(1) . . . 112(n) comprising a first PCIe port 111(1) . . . 111(n) and a second PCIe port 113(1) . . . 113(n). Each of the first PCIe ports 111(1) . . . 111(n) may be connected to a PCIe converter 108 of the plurality of PCIe converters 108(1) . . . 108(n).

In some examples, the edge computing and communications device 100 may include one or more open compute project network interface cards 118(1) . . . 118(n) comprising a communication port 120 (e.g., an Ethernet port, a fiber optic port) and a plurality of third PCIe ports 115(1) . . . 115(n). Each of the second PCIe ports 113(1) . . . 113(n) may be connected to a third PCIe port 115(1) . . . 115(n). The communication port 120 may be connected to the Internet.

In some examples, the edge computing and communications device 100 may include a software defined radio (SDR) 110. The SDR 110 may implement a 5G/6G gNodeB software framework for a 5G/6G radio access network (RAN) solution. The SDR 110 may implement both non-standalone (NSA) and standalone (SA) modes. The SDR 110 may meet base station service requirements for enhanced mobile broadband (eMBB), ultra-reliable and low latency communications (URLCC), and massive machine type communications (mMTC). The SDR 110 may be configured to communicate with a user device using at least one of a third generation partnership project (3GPP) 4G protocol, a 3GPP 5G protocol, a 3GPP 6G protocol, or a WiFi protocol.

The edge computing and communications device 100 may include a remote control port 104 connected to an Ethernet to general purpose input/output bridge 106. The Ethernet to general purpose input/output bridge 106 may be configured to receive control commands from the remote control port 104 and enable one or more of the plurality of computing devices 112(1) ... 112(n) based on the control commands.

In some aspects, the Ethernet to general purpose input/output bridge 106 may include a plurality of input/output ports 119(1) ... 119(n) connected to an enable port 121(1) ... 121(n) of the plurality of computing modules 112(1) ... 112(n). The input/output ports 119(1) ... 119(n) may be configured to enable one or more of the plurality of computing modules 112(1) ... 112(n) based on controlling a state of the enable port 121(1) ... 121(n). The commands received at the control port 104 may be used to control the input/output ports 119(1) ... 119(n) which in turn control the state of the enable port 121(1) ... 121(n) and the state (e.g., enabled, disabled, wake, sleep, etc.) of the computing modules 112(1) ... 112(n).

The edge computing and communications device 100 may include a multiple-input multiple output (MIMO) radio 116 connected to the software defined radio 110. The MIMO radio 116 may include multiple transmission and receiving antennas 124(1) ... 124(n) to exploit multipath propagation.

The edge computing and communications device 100 may include a forward error correction coprocessor 114. The software defined radio 110 may be configured to offload forward error correction processing to the forward error correction coprocessor 114.

In some aspects, the software defined radio 110 may include fourth PCIe ports 125(1) ... 125(n). The PCIe port 125(3) may be connected to any of the open compute project network interface cards 118(1) ... 118(n) through switch 117. The open compute project network interface cards 118(1) ... 118(n) may be configured to provide backhaul communications to the Internet for the software defined radio 110.

In some aspects, the edge computing and communications device 100 may include one or more memory devices. The management port 103 may be configured to receive software updates (e.g., software/firmware updates) associated with the plurality of computing modules 112(1) ... 112(n) and store the software updates in the one or more memory devices.

In some aspects, the edge computing and communications device 100 may be configured to execute cloud based application software. The cloud based application software may include, without limitation at least one of content delivery, enterprise applications, mobile commerce, data storage, customer relationship management, social networking, or video conferencing.

Figure 2:
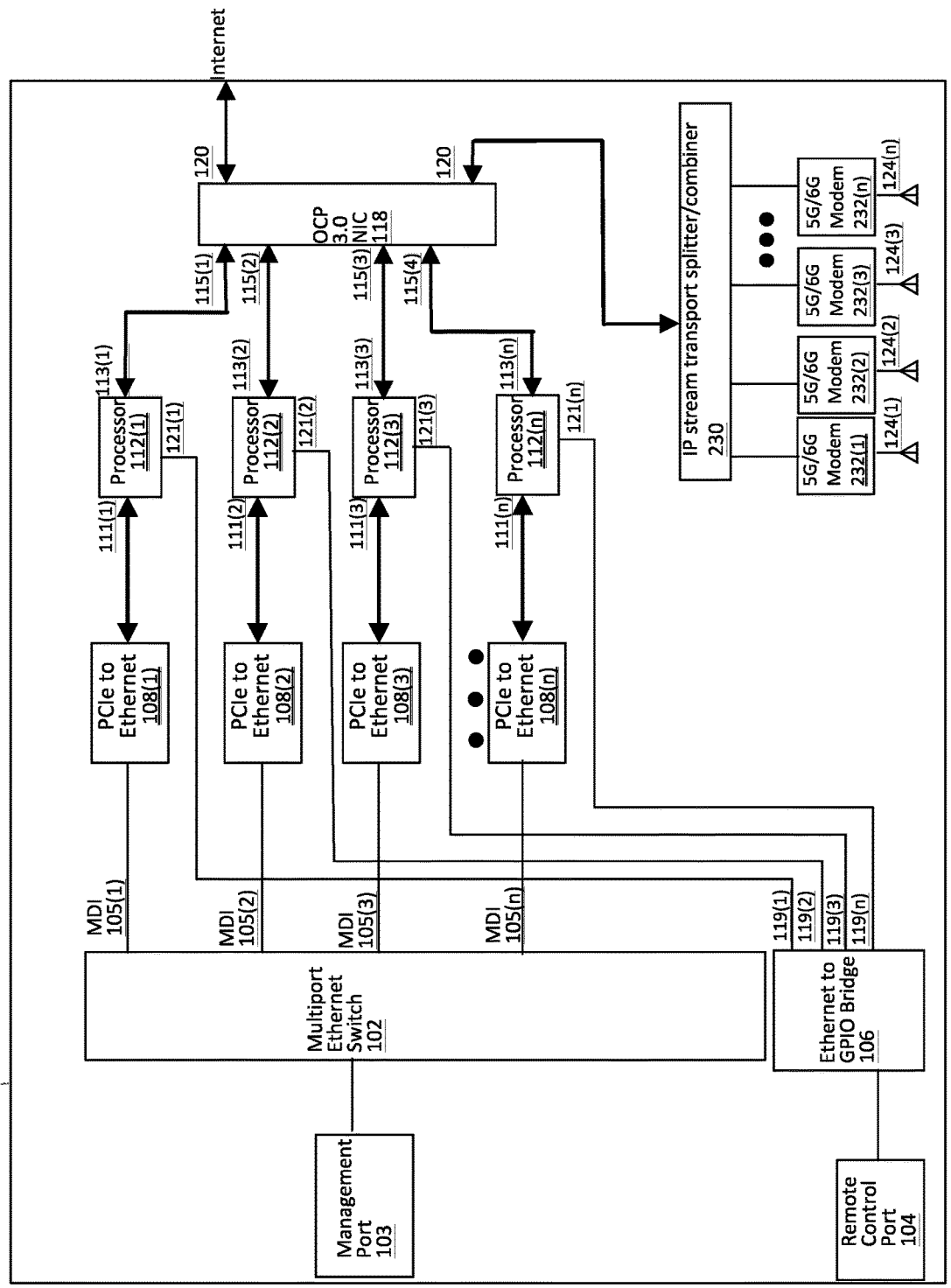
FIG. 2 illustrates a device and system for network edge computing using IP stream splitting, according to an embodiment of the present disclosure.

FIG. 2 illustrates an edge computing and communications device 200, according to an embodiment of the present disclosure. The edge computing and communications device 200 may include multiple computing modules (e.g., processors) 112 for providing edge cloud computing and high throughput IP traffic aggregation. The edge computing and communications device 200 may include at least one communication port (e.g., Ethernet, fiber optic, etc.) 118, multiple processors 112(1) ... 112(n), and multiple 5G/6G radio modems 232(1) ... 232(n). The 5G/6G modems 232(1) ... 232(n) may be configured to execute protocols conformant with 3GPP 5G and/or 3GPP 6G standards. The processors 112(1) ... 112(n) may execute cloud based application software as described above. In some examples, the at least one wired communication port 118 provides a network backhaul for 5G/6G data traffic. In some examples, the cloud based application software includes at least one of content delivery, enterprise applications, mobile commerce, social networking, and video conferencing. The computing modules 112(1) ... 112(n) and systems described and/or illustrated herein broadly represent any type or form of computing device or system capable of executing computer-readable instructions, such as those contained within the computing modules 112(1) ... 112(n) described herein. In their most basic configuration, these computing modules 112(1) ... 112(n) may each include at least one memory device and at least one physical processor. The edge computing and communications device 200 may be configured for high throughput. The IP stream transport splitter 230 may separate IP packets within an IP transport stream. The separated IP packets may be sent over different radio bearers by different modems 232(1) ... 232(n) to user equipment and/or to a 5G/6G base station for delivery over a core network. A server in the core network may recombine the separated IP streams into the original IP stream for delivery to the intended destination.

In some examples, the edge computing and communications device 200 may include an Ethernet switch 102 comprising a management port 103 and a plurality of medium dependent interface (MDI) ports 105(1) ... 105(n).

In some examples, the edge computing and communications device 200 may include a plurality of Ethernet to peripheral component interconnect express (PCIe) converters 108(1) ... 108(n). Each of the plurality of MDI ports 105(1) ... 105(n) may be connected to a PCIe converter 108 of the plurality of PCIe converters 108(1) ... 180(n).

In some examples, the edge computing and communications device 200 may include a plurality of computing modules (e.g., processors) 112(1) ... 112(n) comprising a first PCIe port 111(1) ... 111(n) and a second PCIe port 113(1) ... 113(n). Each of the first PCIe ports 111(1) ... 111(n) may be connected to a PCIe converter 108 of the plurality of PCIe converters 108(1) ... 108(n).

In some examples, the edge computing and communications device 200 may include one or more open compute project network interface cards 118(1) ... 118(n) comprising a communication port 120 (e.g., an Ethernet port, a fiber optic port) and a plurality of third PCIe ports 115(1) ... 115(n). Each of the second PCIe ports 113(1) ... 113(n) may be connected to a third PCIe port 115(1) ... 115(n). The communication port 120 may be connected to the Internet.

In some examples, the edge computing and communications device 200 may include 5G/6G modems 232(1) ... 232(n). The 5G modems 232(1) ... 232(n) may implement a 5G/6G gNodeB software framework for a 5G/6G radio access network (RAN) solution. The 5G/6G modems 232(1) ... 232(n) may implement both non-standalone (NSA) and standalone (SA) modes. The 5G/6G modems 232(1) ... 232(n) may meet base station service requirements for enhanced mobile broadband (eMBB), ultra-reliable and low latency communications (URLCC), and massive machine type communications (mMTC). The 5G/6G modems 232(1) ... 232(n) may be configured to communicate with a user device using at least one of a third generation partnership project (3GPP) 4G protocol, a 3GPP 5G protocol, a 3GPP 6G protocol, or a WiFi protocol.

The edge computing and communications device 200 may include a remote control port 104 connected to an Ethernet to general purpose input/output bridge 106. The Ethernet to general purpose input/output bridge 106 may be configured to receive control commands from the remote control port 104 and enable one or more of the plurality of computing devices 112(1) . . . 112(n) based on the control commands.

In some aspects, the Ethernet to general purpose input/output bridge 106 may include a plurality of input/output ports 119(1) . . . 119(n) connected to an enable port 121(1) . . . 121(n) of the plurality of computing modules 112(1) . . . 112(n). The input/output ports 119(1) . . . 119(n) may be configured to enable one or more of the plurality of computing modules 112(1) . . . 112(n) based on controlling a state of the enable port 121(1) . . . 121(n). The commands received at the control port 104 may be used to control the input/output ports 119(1) . . . 119(n) which in turn control the state of the enable port 121(1) . . . 121(n) and the state (e.g., enabled, disabled, wake, sleep, etc.) of the computing modules 112(1) . . . 112(n).

The edge computing and communications device 200 may include an IP transport splitter/combiner 230 connected to the open compute project network interface card (OCP NIC) 118. The IP transport module may be configured to demultiplex (e.g., split) a first IP transport stream and/or multiplex (e.g., combine) a second IP transport stream. The IP transport streams may be transmitted to and/or received from the processors 112(1) . . . 112(n) through the OCP NIC 118.

The edge computing and communications device 200 may include a plurality of 5G/6G wireless modems 232(1) . . . 232(n) connected to the IP stream transport splitter/combiner 230. The 5G/6G wireless modems 232(1) . . . 232(n) may be configured to communicate multiple IP transport streams including at least one of the first IP transport stream and/or the second IP transport stream.

In some aspects, the edge computing and communications device 200 may include one or more memory devices. The management port 103 may be configured to receive software (e.g., software/firmware updates) associated with the plurality of computing modules 112(1) . . . 112(n) and store the software in the one or more memory devices.

In some aspects, the edge computing and communications device 200 may be configured to execute cloud based application software. The cloud based application software may include, without limitation at least one of content delivery, enterprise applications, mobile commerce, data storage, customer relationship management, social networking, or video conferencing.

In some examples, the term "memory" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "processor" or "compute module" generally refers to any type or form of hardware-implemented processing unit capable of interpreting and/or executing computer-readable instructions. In one example, a processor may access and/or modify one or more modules stored in the above-described memory device. Examples of processors include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

The invention claimed is:

1. An edge computing and communications device, comprising:
   an Ethernet switch comprising a management port and a plurality of medium dependent interface (MDI) ports;
   a plurality of Ethernet to peripheral component interconnect express (PCIe) converters, wherein each of the plurality of MDI ports is connected to a PCIe converter of the plurality of PCIe converters;

a plurality of computing modules comprising a first PCIe port and a second PCIe port, wherein the first PCIe port is connected to a PCIe converter of the plurality of PCIe converters;
an open compute project network interface card comprising a fiber optic port and a plurality of third PCIe ports, wherein the second PCIe port is connected to a third PCIe port and the fiber optic port is connected to the internet;
an IP transport module connected to the open compute project network interface card, wherein the IP transport module is configured to:
  demultiplex a first IP transport stream; and
  multiplex a second IP transport stream;
a software defined radio; and
a remote control port connected to an ethernet to general purpose input/output bridge, wherein the ethernet to general purpose input/output bridge is configured to:
  receive control commands;
  enable, based on the control commands and a predefined level of security classification associated with data scheduled for transmission:
    one of the plurality of computing modules; and
    one of a plurality of communication ports; and
  disable, based on the control commands and the predefined level of security classification associated with the data scheduled for transmission, remaining communication ports of the plurality of communication ports,
wherein the predefined level of security classification comprises at least one of top secret, secret, classified, or unclassified.

2. The edge computing and communications device of claim 1, wherein the ethernet to general purpose input/output bridge comprises a plurality of input/output ports connected to an enable port of the plurality of computing modules and is configured to enable the one or more of the plurality of computing modules based on controlling a state of the enable port.

3. The edge computing and communications device of claim 1, further comprising a multiple-input multiple output (MIMO) radio connected to the software defined radio.

4. The edge computing and communications device of claim 1, wherein the software defined radio is configured to communicate with a user device using at least one of a third generation partnership project (3GPP) 4G protocol, a 3GPP 5G protocol, a 3GPP 6G protocol, or a WiFi protocol.

5. The edge computing and communications device of claim 1, further comprising a forward error correction coprocessor, wherein the software defined radio is configured to offload forward error correction processing to the forward error correction coprocessor.

6. The edge computing and communications device of claim 1, wherein the software defined radio comprises a fourth PCIe port connected to the open compute project network interface card, wherein the open compute project network interface card is configured to provide backhaul communications for the software defined radio.

7. The edge computing and communications device of claim 1, further comprising one or more memory devices, wherein the management port is configured to:
  receive software updates associated with the plurality of computing modules; and
  store the software updates in the one or more memory devices.

8. The edge computing and communications device of claim 1, wherein the edge computing and communications device is configured to execute cloud based application software.

9. The edge computing and communications device of claim 8, wherein the cloud based application software includes at least one of:
  content delivery;
  enterprise applications;
  mobile commerce;
  data storage;
  customer relationship management;
  social networking; or
  video conferencing.

10. An edge computing and communications device, comprising:
  an Ethernet switch comprising a management port and a plurality of medium dependent interface (MDI) ports;
  a plurality of Ethernet to peripheral component interconnect express (PCIe) converters, wherein each of the plurality of MDI ports is connected to a PCIe converter of the plurality of PCIe converters;
  a plurality of computing modules comprising a first PCIe port and a second PCIe port, wherein the first PCIe port is connected to a PCIe converter of the plurality of PCIe converters;
  an open compute project network interface card comprising a communications port and a plurality of third PCIe ports, wherein the second PCIe port is connected to a third PCIe port and the communications port is connected to the internet;
  an IP transport module connected to the open compute project network interface card, wherein the IP transport module is configured to:
  demultiplex a first IP transport stream; and
  multiplex a second IP transport stream; and
  a remote control port connected to an ethernet to general purpose input/output bridge, wherein the ethernet to general purpose input/output bridge is configured to:
  receive control commands;
  select one or more of the plurality of computing modules based on the control commands;
  enable, based on the control commands and a predefined level of security classification associated with data scheduled for transmission:
    one of the plurality of computing modules; and
    one of a plurality of wireless modems; and
  disable, based on the control commands and the predefined level of security classification associated with the data scheduled for transmission, remaining wireless modems of the plurality of wireless modems,
  wherein the predefined level of security classification comprises at least one of top secret, secret, classified, or unclassified.

11. The edge computing and communications device of claim 10, wherein the ethernet to general purpose input/output bridge comprises a plurality of input/output ports connected to an enable port of the plurality of computing modules and is configured to enable the one or more of the plurality of computing modules based on controlling a state of the enable port.

12. The edge computing and communications device of claim 10, wherein the plurality of wireless modems are configured to communicate at least one of the first IP transport stream or the second IP transport stream.

13. The edge computing and communications device of claim 10, wherein at least one of the first IP transport stream or the second IP transport stream is associated with at least one of the plurality of computing modules.

14. The edge computing and communications device of claim 10, further comprising one or more memory devices, wherein the management port is configured to:
   receive software updates associated with the plurality of computing modules; and
   store the software updates in the one or more memory devices.

15. The edge computing and communications device of claim 10, wherein the edge computing and communications device is configured to execute cloud based application software.

16. The edge computing and communications device of claim 15, wherein the cloud based application software includes at least one of:
   content delivery;
   enterprise applications;
   mobile commerce;
   data storage;
   customer relationship management;
   social networking; or
   video conferencing.

\* \* \* \* \*